J. O. B. STREET.
PROCESS OF GRADING COTTON SEED.
APPLICATION FILED DEC. 22, 1910.
1,025,028.  Patented Apr. 30, 1912.
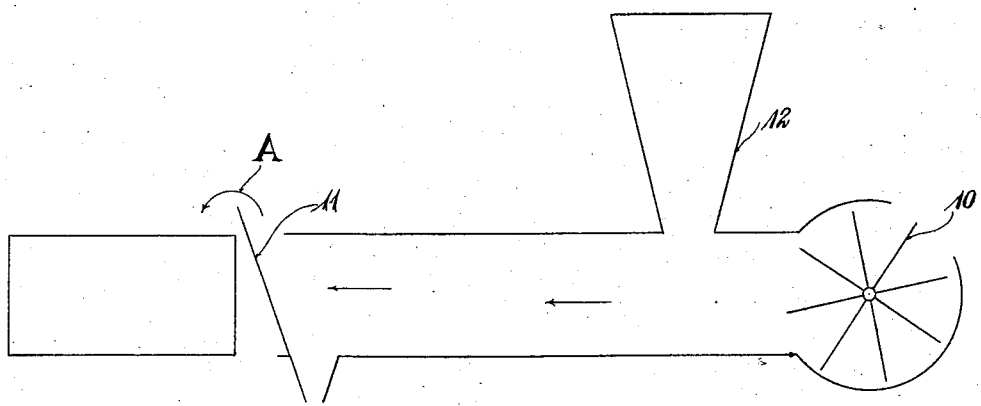
Witnesses
M. A. O'Connor
Ernest F. Riley
Inventor
John O. B. Street
By Chandler & Chandler
Attorneys

UNITED STATES PATENT OFFICE.

JOHN O. B. STREET, OF OKEMAH, OKLAHOMA.

PROCESS OF GRADING COTTON-SEED.

1,025,028.  Specification of Letters Patent.  Patented Apr. 30, 1912.

Application filed December 22, 1910. Serial No. 598,792.

*To all whom it may concern:*

Be it known that I, JOHN O. B. STREET, a citizen of the United States, residing at Okemah, in the county of Okfuskee, State of Oklahoma, have invented certain new and useful Improvements in Processes for Grading Cotton-Seed; and I do hereby declare the following to be a full, clear, and exact description of the invention, such as will enable others skilled in the art to which it appertains to make and use the same.

My invention relates to processes for grading cotton seed and my object is in general to increase the efficiency and utility of this operation.

More particularly the invention relates to a process by means of which the fanning operation, which is successfully used in many kindred arts, may be adapted to the grading of cotton seed.

A fanning mill is shown in diagram in the drawing, said fanning mill being provided with a blast fan 10, the blast of which is directed toward a baffle plate 11, the hopper 12 being arranged intermediate said fan and baffle plate, the seed being fed through said hopper.

The treatment of cotton seed is differentiated from that of grain seed by reason of the fact that the former, as it comes from the gin, is covered with fuzz or lint coating which causes the seeds to adhere to each other in bunches and further by reason of its uncertainty or uneven character renders mechanical grading operations almost impossible of performance. The perfect and imperfect, large and small seeds are all coated indiscriminately to an uncertain degree with this fuzz or lint, and in order to grade the seeds effectively it has in the past been found necessary to resort to hand selection, the seeds thus obtained being planted separately in a seed patch to obtain the next year's seed.

An analysis of the fanning operation, as applied to the selection of grain seed, discloses the fact, already proved by practical experience, that cotton seeds in their normal condition in which they are discharged from the gin are totally unsuited to be successfully manipulated by this means. In general, the action of an air blast upon a given seed may be said to be dependent upon the three particulars of form, size and weight. It is at once apparent that where each seed is coated with an indefinitely varying amount of lint, any attempt to effect a selection of seeds by the fanning method must fail. My improvement consists in first treating the seeds to overcome the difficulty above mentioned, and in then subjecting the treated seeds to a fanning operation which selection will be accomplished on the basis of size and weight only or more simply upon specific gravity, and in this manner assuring an efficient grading operation.

In order to prepare the seed for the fanning operation I subject them to a bath of some species of binding material, preferably a weak solution of some suitable glutinous or mucilaginous substance. On emerging from this bath it will be found that the lint or fuzz coating is bound or held down by the thin film of the binder which adheres to the seed. After drying the seed are then reduced to a state in which their resistance to an air blast will be directly dependent upon their specific gravities, the uniform lint or fuzz coating having been by this treatment reduced to a thin shell adhering closely to the body of the seed and of negligible weight and volume. The seed as above treated is then placed in a fanning mill which may be of any desired form and an air-blast directed upon the same, blowing the seeds with considerable force against an inclined surface or baffle 11. The seeds of low specific gravity, which may be taken to indicate defectiveness in some particular, will be more strongly effected by the blast than the normal seeds, and upon striking the inclined baffle will follow the direction of the blast up over the edge of the baffle to some suitable receiver. The normal or heavier seeds on the contrary, on striking the baffle will of their own weight drop to the bottom of the same to a selected seed receptacle out of range of the blast. After having in this manner selected normal seeds of all sizes from the abnormal seed, the selected material may be passed through suitable sieves for grading as to size, and the final result will be to provide a small residue of choice seed suitable in every respect for planting. The discarded seeds are not injured in any manner by the selecting operation and may be used as an inferior seed for planting or disposed of for any other purpose.

I am aware that binding solutions have previously been used in order to prepare seeds for planting but I am not aware of any previous use of this operation of a method of reducing the seed to a state in which it may be effectively operated upon by a fanning method, and a selection which separates normal from abnormal seeds irrespective of size alone thus accomplished.

Although I have described the process as applied exclusively to the grading of cotton seeds, it will be understood that the improvement herein set forth may be used for grading operations on any seed where similar difficulties are encountered, without departing from the spirit of the invention.

What I claim is:

A method of grading cotton seed according to its weight consisting of coating the seed with a binder which will hold down the lint and subjecting the seed thus coated to an air blast.

In testimony whereof, I affix my signature, in presence of two witnesses.

JOHN O. B. STREET.

Witnesses:
  Jos. R. MOUCH,
  A. J. MARTIN.

---

Copies of this patent may be obtained for five cents each, by addressing the "Commissioner of Patents, Washington, D. C."